United States Patent

Brulard

[11] 3,932,379
[45] Jan. 13, 1976

[54] WATER-SOLUBLE MAROON AND RUBINE SULPHODIPHENYLAZOPHENYL- OR NAPHTHYLAZOANILINE DYES FOR POLYAMIDE FIBERS

[75] Inventor: Andre T. Brulard, Villerot, Belgium

[73] Assignee: Althouse Tertre en abrege "Atsa" societe anonyme, Brussels, Belgium

[22] Filed: Jan. 4, 1973

[21] Appl. No.: 320,848

[52] U.S. Cl. .............. 260/191; 260/177; 260/184; 260/186; 260/187; 260/196; 260/206
[51] Int. Cl.² C09B 31/04; C09B 31/08; D06P 3/24
[58] Field of Search ............ 260/174, 186, 187, 191

[56] References Cited
UNITED STATES PATENTS

| | | | |
|---|---|---|---|
| 3,092,616 | 6/1963 | Gaetani | 260/186 |
| 3,293,240 | 12/1966 | Koike et al. | 260/186 |
| 3,351,580 | 11/1967 | Koike et al. | 260/160 |
| 3,479,332 | 11/1969 | Jirou et al. | 260/186 |
| 3,485,814 | 12/1969 | Speck | 260/186 |
| 3,580,901 | 5/1971 | Feeman | 260/191 |

*Primary Examiner*—Floyd D. Higel
*Attorney, Agent, or Firm*—Synnestvedt & Lechner

[57] ABSTRACT

Compounds useful for imparting deep maroon and rubine shades to natural and synthetic polyamide fibers of the formula:

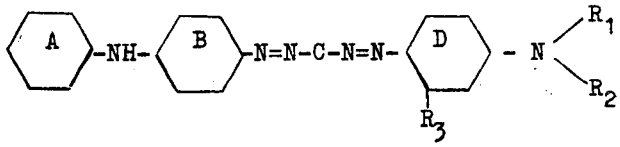

in which:
A and B represent phenyl rings, a $-SO_3H$ group being attached to one of said rings, to which other non solubilizing groups selected among lower alkyl or alkoxy, $NO_2$ and halogen may be attached;

C represents a naphthyl group or a phenyl group, one or two lower alkyl or alkoxy groups being possibly attached to said phenyl ring;

D represents a phenyl ring;

$R_1$ represents hydrogen or a lower alkyl radical which may be substituted by a cyano, hydroxy, acyloxy, halogeno or acyl group;

$R_2$ represents a lower alkyl radical which may be substituted by a cyano, hydroxy, acyloxy, halogeno, sulfonic acid or phenyl radical, the phenyl radical being possibly substituted by a non ionogen or ionogen solubilizing group, and $R_3$ represents hydrogen, a halogen or a lower alkyl or alkoxy group.

4 Claims, No Drawings

WATER-SOLUBLE MAROON AND RUBINE SULPHODIPHENYLAZOPHENYL- OR NAPHTHYLAZOANILINE DYES FOR POLYAMIDE FIBERS

DETAILED DESCRIPTION OF THE INVENTION

This invention relates to new valuable maroon and rubine water soluble disazo dyes for natural and synthetic polyamide fibers, such as nylon, silk or wool having the general structure:

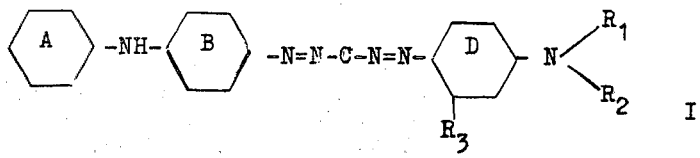

wherein:
A and B represent phenyl rings, at least one of these rings being substituted by a —SO$_3$H group and possibly also by other non solubilizing groups selected among the lower alkyl and alkoxy groups containing 1 to 4 carbon atoms, NO$_2$ and halogens;
C represents a group selected among the groups of the formulae:

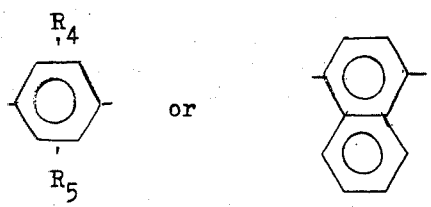

wherein R$_4$ and R$_5$ which may be identical or different from each other represent hydrogen or a lower alkyl or alkoxy radical containing 1 to 4 carbon atoms,
D represents a phenyl ring,
R$_1$ represents hydrogen or a lower alkyl radical containing 1 to 4 carbon atoms which may be substituted by a cyano, hydroxy, acyloxy, halo or aryl group;
R$_2$ represents a lower alkyl radical containing 1 to 4 carbon atoms, which may be substituted by a cyano, hydroxy, acyloxy, halo, sulfonic acid or phenyl group, the latter being possibly substituted by a non ionogen or an ionogen solubilizing group, and
R$_3$ represents hydrogen, a halogen or a lower alkyl or alkoxy radical containing 1 to 4 carbon atoms.

The new compounds of formula I may be prepared by a method comprising the following steps:
1. Diazotizing in the usual manner a 4-amino-1,1'-diphenylamino-monosulfonic acid of the general formula

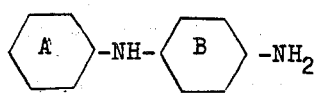

in which A and B have the above meanings;
2. Coupling the obtained diazonium salt of the acid of formula II with 1-naphthylamine or an aromatic amine of the general formula

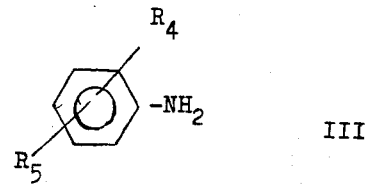

in which R$_4$ and R$_5$ have the above meanings;
3. Rediazotizing the obtained amino azo intermediate;
4. Coupling the obtained diazonium salt with a N-substituted mono or di-alkylamine derivative of the formula:

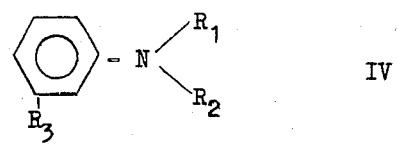

in which R$_1$, R$_2$ and R$_3$ have the above meanings.

When desirable, in order to increase the rate of the first coupling (step 2), the aromatic amine of formula III may be first converted into its N-ω-methane sulfonic acid derivative by reaction with a formaldehyde-sodium bisulfite adduct, the coupling being then carried out at a weakly acidic to neutral pH, possibly in the presence of a buffer or a coupling accelerator.

After the coupling reaction, the methane-sulfonic radical may be easily removed by heating in alkaline solution to regenerate the diazotable free amino-monoazointermediate.

If desired, the monoazo intermediate may be isolated prior to the rediazotation (step 3) or possibly purified. Rediazotation may occur between 0° and 50°C in aqueous acidic solution of hydrochloric, sulfuric or phosphoric acid.

The final coupling (step 4) is preferably carried out in weakly acidic aqueous solution and the resulting disazo dyestuff isolated by filtration.

Suitable starting 4-amino-diphenylamino-monosulfonic acid derivatives of formula II include, for example, 4-amino-1,1'-diphenylamino-2-sulfonic acid, 4-amino-1,1'-diphenylamino-2'-methoxy-2-sulfonic acid, 4-amino-1,1'-diphenylamino-4'-nitro-2'-sulfonic acid and 4-amino-1,1'-diphenylamino-2'-nitro-4'-sulfonic acid.

Suitable coupling amines of the formula III may be, for example, 1 naphthylamine, aniline, o- or m- toluidines, o- or m- anisidines or phenetidines, cresidine,2,3,2,5 or 2,6 dimethoxyanilines, 3-amino-4-ethoxytoluene, o-propylaniline, etc. . . . In any case, the para position to the amino group must be unsubstituted.

The final N-substituted phenylamino coupling components of the general formula IV may be N-hydroxyethylaniline, N-dihydroxyethylaniline, m-chloraniline or toluidine, N-cyanoethylacetoxyethylaniline, N-isopropyl-hydroxyethylaniline, N-methyl-N-cyanoethyl-m-toluidine, N-ethyl-benzylaniline, N-ethyl-m-sulfo-benzylaniline, N-ethyl-N-(m-tolyl)-3-amino propane-sulfonic acid, N-benzyl-phenyl-3-amino propane sulfonic acid.

The new disazo dyes of the present invention have very good solubility in water, even when they have only one sulfonic acid group in the molecule, and this despite their sometimes high molecular weight.

In aqueous solution, they dye wool perfectly well, but are preferably useful for the dyeing of synthetic polyamide fibers. The monofulfonic acid dyes exhaust very well in neutral to weakly alkaline dyeing conditions. A somewhat lower pH is preferably used for the dyeing with the disulfonic acid derivatives.

Exhaust properties, covering barre, levelling, light and general fastnesses are extremely good. The very deep shades obtained, mainly in the maroon and rubine area, allow these dyes to be used in admixture with other colors to produce, for example on nylon, black shades of very high intensity and quality.

The following examples will serve to illustrate the invention in respect of the preparation and use of the dyes. Unless otherwise indicated, parts and percentages are by weight and temperatures are in degrees centigrade.

EXAMPLES

EXAMPLE 1

A slightly alkaline solution of 30.9 parts of 4-amino-1,1'-diphenylamino-4'-nitro-2'-sulfonic acid and 7.1 parts of sodium nitrite in 250 parts of water was filtered to eliminate some impurities and then poured with good stirring into a mixture of 35 parts of concentrated hydrochloric acid and 125 parts of water and ice. Temperature: 15°.

Meanwhile, 15.4 parts of 2,5-dimethoxyaniline were dissolved in 75 parts of water and 15 parts of concentrated HCl. This solution was added to the diazonium salt slurry, and the pH of the mixture was slowly raised to 3.5 by adding diluted sodium hydroxide solution.

When coupling was complete, the amino-monoazo compound was filtered. It was then dissolved in 600 parts of water and alkali at a pH of about 8.

To this clarified solution, 9 parts of $NaNO_2$ were added, followed by rapid pouring of 40 parts of concentrated HCl. After 2 hours stirring, the temperature was reduced with a little ice and the excess of nitrous ions of the obtained diazonium salt was removed by adding some sulfamic acid.

A warm hydrochloric acid solution of 16.4 parts of N-dihydroxyethylaniline in 65 parts of water was then added to the diazonium salt and the pH of the mixture was raised to 5 by addition of 12 g of sodium acetate. After 10 hours of stirring at room temperature, the coupling was complete and the disazo dye was separated by filtration.

Impurities were removed by dissolving and reprecipitating the dyestuff in hot water.

The dried dyestuff is a black powder which dyes polyamide fibers in neutral to alkaline baths in dark rubine shade of very good fastness to light and washing.

EXAMPLE 2

A solution of 30.9 parts of 4-amino-2'-nitro-1,1'-diphenylamino-4'-sulfonic acid was diazotized according to the process described in example 1, and to the slurry a warm solution of 14.2 parts of 1-naphthylamine in 150 parts of water and 31 parts of diluted hydrochloric acid was added. The pH of the mixture was slowly raised to 4.5 by slow addition of caustic soda in solution; temperature was raised to 35° after 5 hours. The so obtained suspension of amino monoazo compound was filtered and washed with hydrochloric acid to remove the eventual excess of 1-naphthylamine.

The cake was reslurried in 800 parts of water and 25.6 parts of a 30% NaOH solution were added to raise the pH to 11. After heating at 40°, 43 parts of concentrated HCl were poured very rapidly followed by a slow addition of 8.2 parts of $NaNO_2$ in aqueous solution.

After stirring during 1 hour, the diazo slurry was filtered and repasted in 1,500 parts of cold water. After addition of 16.4 parts of N-dihydroxyethylaniline, the pH was raised to 5 by addition of 116 parts of crystallized sodium acetate. After several hours of stirring, the coupling was complete and the disazo maroon dye was filtered. It was purified by treating the paste with hot water and ethanol.

The rubine shade obtained by dyeing polyamide fibers in sodium mono phosphate bath is very dark and fast to light and washing.

Similar dyes dyeing in somewhat more acid dyeing conditions can be obtained when, for example, instead of N-dihydroxyethylaniline, N-ethyl-N-m-sulfobenzylaniline or N-ethyl-N-m-tolyl-3 amino propane sulfonic acid are used as second coupling component.

EXAMPLE 3

26.4 parts of 4-amino-1,1'-diphenylamino-2-sulfonic acid were diazotized according to the usual process at 0.5° by means of 7 parts of $NaNO_2$ in aqueous solution in the presence of HCl.

To the cold disazo suspension, a solution of 14.3 parts of 1-naphthylamine hydrochloride was added. The pH was then allowed to reach 3 by addition of 24 parts of NaOH (30%). After 2 hours, the pH was dropped again to 1.5 by addition of hydrochloric acid; the slurry was heated and the aminoazo compound filtered.

After repasting in 1,000 parts of water and Na OH at a pH of 11 and a temperature of 40°, 43 parts of concentrated HCl were rapidly added, followed by a solution in water of 7.5 parts of $NaNO_2$.

The filtered diazo compound was repasted in 700 parts of cold water and finally coupled with 16.4 parts of dihydroxyethylaniline. The obtained new disazo dye was filtered and dried.

This compound dyes nylon, silk and wool from neutral aqueous baths in very dark violet blue shade of excellent fastnesses.

EXAMPLES 4 to 11

In the following table are listed intermediates which were used to make other dyes of the general formula I. When prepared by methods similiar to those described in the first three examples, the dyes dye polyamide fibers in light- and wash-fast more or less bluish, maroon or rubine shades.

TABLE

| Example number | Diazotable 4-amino-1-diphenylamine derivative | First coupling component | Second Coupling component |
|---|---|---|---|
| 4 | 2'-nitro-4'-sulfo | o-anisidine | N-benzyl hydroxyethylaniline |
| 5 | 2'-nitro-4'-sulfo | 1-naphthylamine | N-cyanoethylacetoxyethylaniline |
| 6 | 2'-nitro-4'-sulfo | 1-naphthylamine | N-ethyl-hydroxyethyl-m-toluidine |
| 7 | 4'-nitro-2'-sulfo | 2,5-dimethoxy- | N-dihydroxyethyl-m-chloraniline |
| 8 | 4'-nitro-2'sulfo | p-cresidine | N-dihydroxyethylaniline |
| 9 | 4'-nitro-2'-sulfo | 1-naphthylamine | N-dihydroxyethyl-m-toluidine |
| 10 | 2'-methoxy-2-sulfo | 1-naphthylamine | N-dihydroxy-m-chloraniline |
| 11 | 2'-methoxy-2-sulfo | 1-naphthylamine | N-dihydroxyethylaniline |

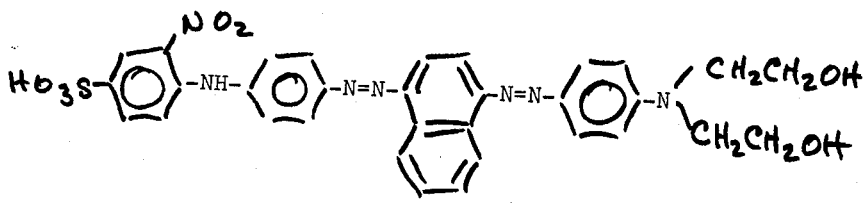

4. A compound according to claim 1 having the structure:
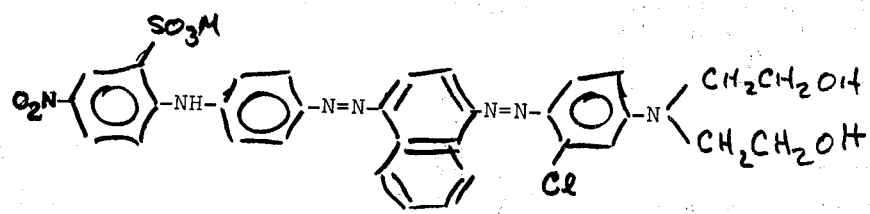

What I claim is:
1. A compound having the structure:

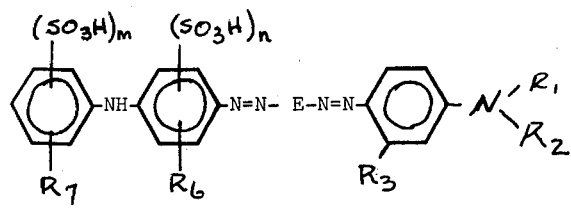

wherein
$R_1$ represents hydrogen alkyl having 1 to 4 carbon atoms, or alkyl having 1 to 4 carbon atoms substituted by cyano or hydroxy;

$R_2$ represents alkyl having 1 to 4 carbon atoms, or alkyl having 1 to 4 carbon atoms substituted by cyano, hydroxy, phenyl or phenyl substituted with a sulfonic acid group;

$R_3$ represents hydrogen, alkyl having 1 to 4 carbon atoms, or alkoxy having 1 to 4 carbon atoms;

E represents:

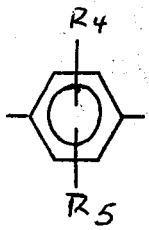 or 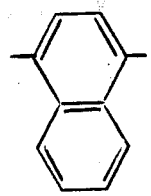

wherein $R_4$ and $R_5$ may be the same or different from each other and represent hydrogen, alkyl having 1 to 4 carbons or alkoxy having 1 to 4 carbon atoms;

$R_6$ represents hydrogen, alkyl having 1 to 4 carbon atoms, alkoxy having 1 to 4 carbon atoms, $-NO_2$ or halogen;

$R_7$ represents hydrogen, alkyl having 1 to 4 carbon atoms, alkoxy having 1 to 4 carbon atoms, $-NO_2$ or halogen;

$m$ represents the integers 0 and 1;
$n$ represents the integers 0 and 1; and
$m + n = 1$.

2. A compound according to claim 1 having the structure:

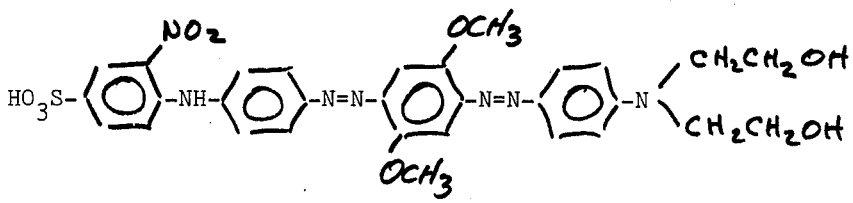

3. A compound according to claim 1 having the structure: